(12) United States Patent
Luscombe

(10) Patent No.: US 12,156,495 B2
(45) Date of Patent: Dec. 3, 2024

(54) HAND RAKEPAN

(71) Applicant: Clint Luscombe, West Des Moines, IA (US)

(72) Inventor: Clint Luscombe, West Des Moines, IA (US)

( * ) Notice: Subject to any disclaimer, the term of this patent is extended or adjusted under 35 U.S.C. 154(b) by 648 days.

(21) Appl. No.: 17/469,401

(22) Filed: Sep. 8, 2021

(65) Prior Publication Data

US 2022/0095532 A1    Mar. 31, 2022

Related U.S. Application Data

(60) Provisional application No. 63/084,056, filed on Sep. 28, 2020.

(51) Int. Cl.
*A01D 7/02* (2006.01)
*A01D 7/06* (2006.01)

(52) U.S. Cl.
CPC ...... *A01D 7/02* (2013.01); *A01D 7/06* (2013.01)

(58) Field of Classification Search
CPC .... A01D 7/00–7/10; A01B 1/00–1/246; B25G 1/00–1/125; A47L 13/52
See application file for complete search history.

(56) References Cited

U.S. PATENT DOCUMENTS

| | | | |
|---|---|---|---|
| 1,576,113 A * | 3/1926 | Gaughan | A01D 11/02 D7/690 |
| 2,315,021 A * | 3/1943 | Schmidt | A01D 7/02 29/521 |
| 4,378,670 A * | 4/1983 | Check | A01D 51/00 56/400.01 |
| 4,520,621 A * | 6/1985 | Archer | A01D 11/00 56/400.01 |
| 4,866,922 A * | 9/1989 | Clark | A01G 20/40 294/51 |
| 5,069,026 A * | 12/1991 | Johnson | A01D 7/10 56/400.17 |
| 5,169,191 A * | 12/1992 | Benz | A01D 51/00 56/400.01 |
| 5,498,046 A * | 3/1996 | Ridley, Sr. | B65F 1/10 15/257.1 |
| 5,609,012 A * | 3/1997 | Anthes | A01D 7/06 56/400.01 |
| 5,687,556 A * | 11/1997 | Lintz | A01D 7/00 56/400.01 |
| 5,706,640 A * | 1/1998 | Tyrrell | A01D 7/00 56/400.01 |

(Continued)

FOREIGN PATENT DOCUMENTS

DE    202013006617 U1 * 10/2013 ............... A01B 1/02

*Primary Examiner* — Adam J Behrens
*Assistant Examiner* — Madeline I Runco
(74) *Attorney, Agent, or Firm* — ZarleyConley PLC

(57) ABSTRACT

The disclosure provided herein is directed to a hand rakepan having a handle, a head, and plurality of tines. The handle, in some aspects, is ergonomically provided to accommodate a variety of grips during use that facilitate manipulation of the hand rakepan as a hand tool using only a single hand. Likewise, in certain aspects, the head of hand rakepan has one or more grooves and notches to provide various grip's to be used during one-handed manipulation of the hand rakepan during raking, collecting, and transporting.

18 Claims, 5 Drawing Sheets

(56) References Cited

U.S. PATENT DOCUMENTS

| | | | | |
|---|---|---|---|---|
| 6,095,340 | A * | 8/2000 | Dedrick | B07B 1/02 |
| | | | | 209/418 |
| 6,408,606 | B1 * | 6/2002 | Hsu | A01D 7/00 |
| | | | | 56/400.04 |
| 6,502,381 | B2 * | 1/2003 | Crites | A01D 7/10 |
| | | | | 56/400.12 |
| 7,347,469 | B1 * | 3/2008 | Renganathan | A01B 1/00 |
| | | | | 294/25 |
| 2003/0033793 | A1 * | 2/2003 | Fairbanks | A01D 7/10 |
| | | | | 56/400.1 |
| 2015/0230400 | A1 * | 8/2015 | Tia | A01D 7/00 |
| | | | | 56/400.01 |
| 2016/0324060 | A1 * | 11/2016 | Pope | A01D 7/00 |
| 2022/0402112 | A1 * | 12/2022 | Hsieh | B25G 1/102 |

* cited by examiner

HAND RAKEPAN

CROSS REFERENCE TO RELATED APPLICATION

This application claims the benefit of U.S. Provisional Application Ser. No. 63/084,056 filed Sep. 28, 2020, the contents of this application is hereby incorporated by reference in its entirety.

BACKGROUND OF THE INVENTION

This invention is directed towards a combination hand tool. More specifically, and without limitation, this invention relates to hand rakepan.

Rakes are well known in the art and are commonly used to gather leaves and other lawn debris when an individual is maintaining the aesthetic and quality of their lawn. A conventional rake has an elongated shaft that allows material to be raked together on the ground while the individual is in a standing position. The elongated shaft connects to a head that can come in a variety of shapes and designs, including those with a closed surface that extend outwardly in a generally triangular fashion. Other heads for rakes are simply tines that angle outwards from the shaft thereby providing a head that is generally open given the space between tines, and lack side walls.

While rakes are useful, once debris is gathered it is difficult to collect and transport that debris to a receptacle or alternative location. For instance, the individual must evaluate a fulcrum point along the elongated shaft from which to grasp in order to be able to collect and thereafter balance the debris collected on the heads and tines of the rake. Rakes that have an open head are particularly difficult as the debris must be sufficiently dense to not simply pass through the head during transport. Even when a solid head is in use, the large size of the head and the length of the shaft, make use cumbersome.

Alternatives to a conventional rake have been developed to address this deficiency. For example, U.S. Pat. No. 6,502,381 to Crites discloses a rake that uses a conventional rake but includes a second head and second set of tines to create a claw like structure to entrap lawn debris. While useful, the additional components of this device make it difficult to not only rake but also to open and close.

Another development in this field is to provide a pair of leaf scoopers, such as that disclosed in U.S. application Ser. No. 14/604,884 to Tia. While this device eliminates the elongated shaft, use is still inhibited due to the lack of control provided by the handle formed by the opening in the head, which can easily rotate and requires excess dexterity and grip strength to use correctly. Moreover, this device requires two large leaf scoopers to operate and causes delay as the device cannot be readily carried in a garden bag or hung from the individual's hip due to their size.

Thus it is a primary objective of this invention to provide a hand rakepan that improves upon the art.

Another objective of this invention is to provide a hand rakepan that facilitates gripping.

Yet another objective of this invention is to provide a hand rakepan that provides various grip positions.

Another objective of this invention is to provide a hand rakepan that is easy to use and ergonomic.

Yet another objective of this invention is to provide a hand rakepan that can be operated while leaving an individual with a free hand.

Another objective of this invention is to provide a hand rakepan that is sized and shaped to easily be stored on an individual while not in use.

Yet another objective of this invention is to provide a hand rakepan that functions as a hand tool.

These and other objectives, features, and advantages of the invention will become apparent from the specification and claims.

SUMMARY OF THE INVENTION

The disclosure provides various aspects of a hand rakepan.

In one aspect of the disclosure, broadly described herein, the hand rakepan has a head that forms a well for the collection of debris after raking is completed. In certain aspects, the head has a generally triangular profile as to provide an enhanced ability to rake without the head encumbering the operation. In other aspects, the head has an end wall with at least a partial curvature to increase the size of the well without inhibiting the ability to use the hand rakepan with a single hand.

In certain aspects of the present invention, the hand rakepan has one or more grooves formed in a top wall and/or end wall, which are configured in some aspects to conform to the shape of a human finger when laid flatly within the groove or when wrapped around the top wall and the end wall of the head. The plurality of grooves allow an individual to grip the hand rakepan in a variety of single-handed ways depending on the desired operation of the hand rakepan. For instance, a thumb can be placed on a handle of the hand rakepan with all remaining fingers placed in the grooves thereby allowing additional downward force during raking and additional support when collecting or transporting. In some aspects, the plurality of grooves are positioned on either side of the handle to accommodate a left-handed or right-handed individual during the various operations of the hand rakepan. In other aspects of the present invention, a bottom edge of the end wall is rounded to allow a finger to wrap over the end wall without being uncomfortable and in particular aspects the bottom edge has one or more notches to permit a finger, such as a thumb, to wrap around and within the notch to facilitate use and provide an ergonomic grip. As with the grooves, the notches in some aspects are positioned on either side of the handle to accommodate the dominant hand of the individual during the various uses of the hand rakepan.

In some other aspects of present invention, the hand rakepan has a handle with one or more flares that allow for an individual to grip the hand rakepan in a variety of single-handed ways depending on the desired operation of the hand rakepan. To allow simple stowage during non-use, the hand rakepan in other aspects has an aperture through the handle to hang the hand rakepan, which in some aspects is further enhanced by the looping of a wrist strap through the aperture.

A plurality of tines extend from the head of the hand rakepan. The plurality of tines, in some aspects, have a lateral portion and a curvature portion which are configured to extend away from and below the head during raking while facilitating collection of debris after raking. In particular aspects, a pair of outermost tines are connected to the first side wall and the second side wall, such that the first side wall and the second side wall extend onto the outermost tines, respectively so the well of the head extends at least partially onto the plurality of tines to improve the storage capacity of the well.

To provide for simple manipulation of the hand rakepan, the size of the hand rakepan in certain aspects is such that it provides for single-handed operation, such as those described further herein. This is facilitated further by the presence of the plurality of grooves and one or more notches.

In other aspects of the present invention, the hand rakepan is monolithically constructed to reduce assembly and/or manufacturing costs.

This has outlined, rather broadly, the features, advantages, solutions, and benefits of the disclosure in order that the description that follows may be better understood. Additional features, advantages, solutions, and benefits of the disclosure will be described in the following. It should be appreciated by those skilled in the art that this disclosure may be readily utilized as a basis for modifying or designing other structures and related operations for carrying out the same purposes of the present disclosure. It should also be realized by those skilled in the art that such equivalent constructions and related operation do not depart from the teachings of the disclosure as set forth in the appended claims. The novel features, together with further objects and advantages, will be better understood from the following description when considered in connection with the accompanying Figures. It is to be expressly understood, however, that each of the Figures is provided for the purpose of illustration and description only and is not intended as a definition of the limits of the present disclosure.

DETAILED DESCRIPTION

Figure 1:
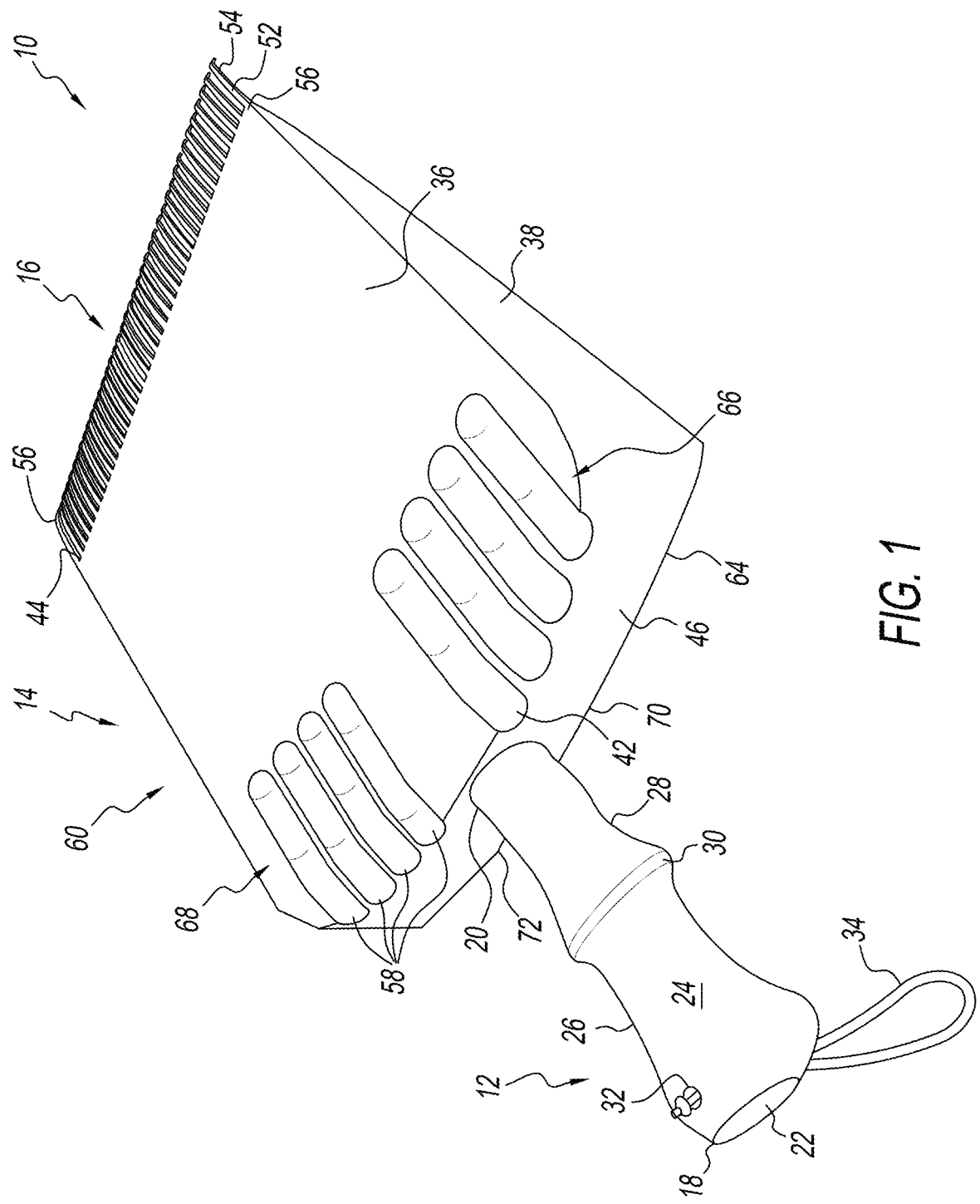
FIG. 1 is a perspective view of a hand rakepan according to an aspect of the disclosure.
Figure 2:
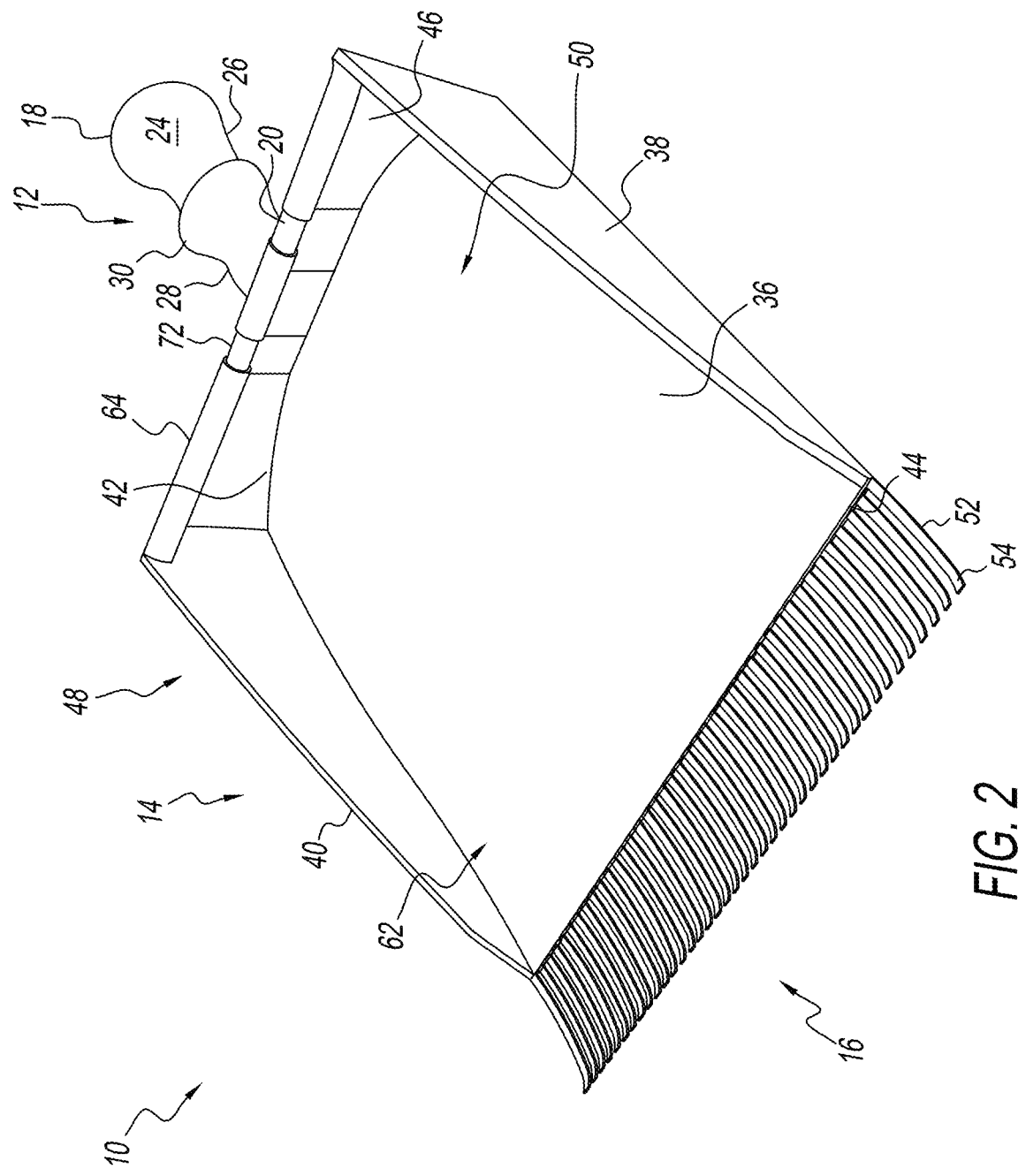
FIG. 2 is a perspective view of a hand rakepan according to an aspect of the disclosure.
Figure 3:
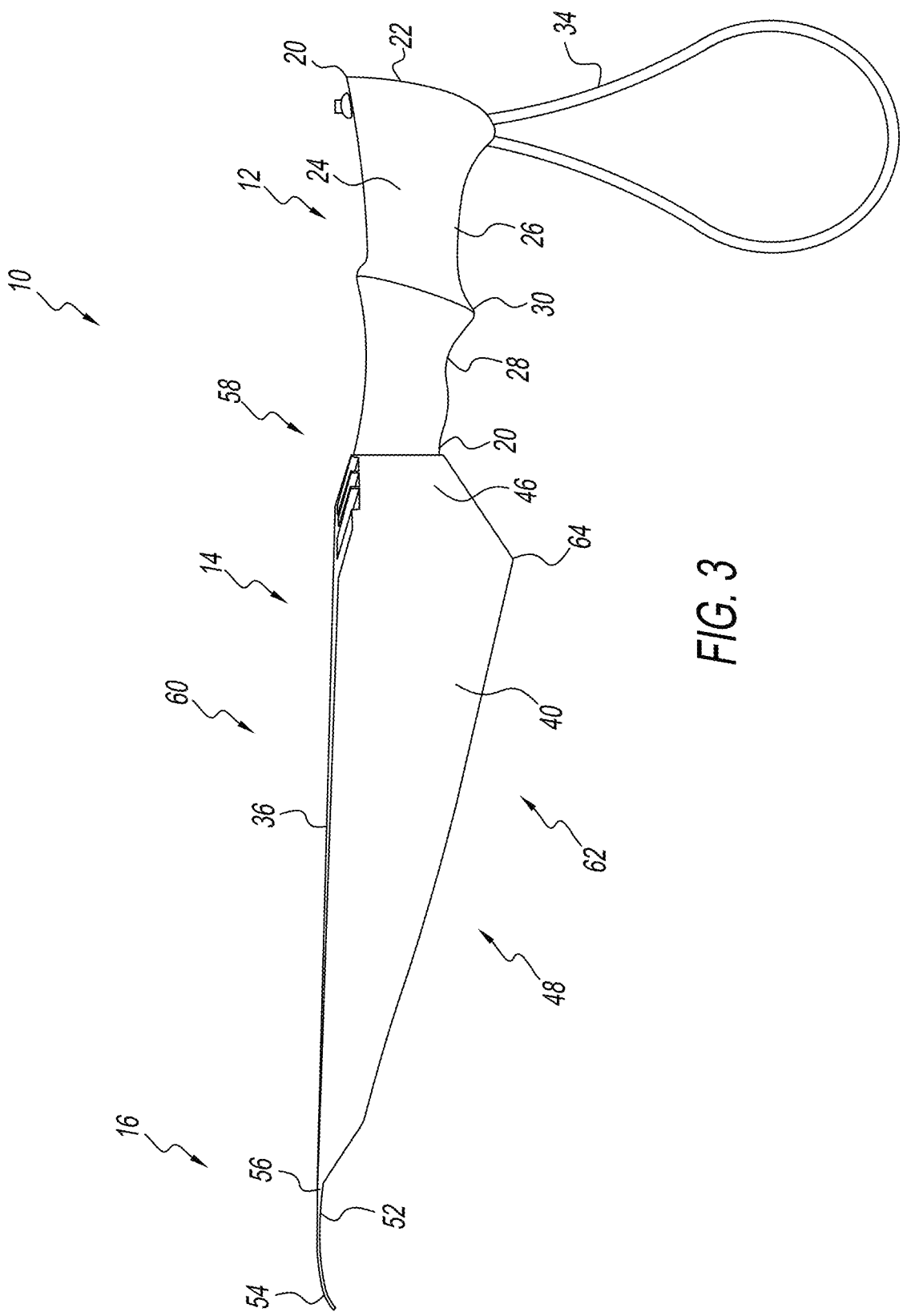
FIG. 3 is a rear view of a hand rakepan according to an aspect of the disclosure.
Figure 4:
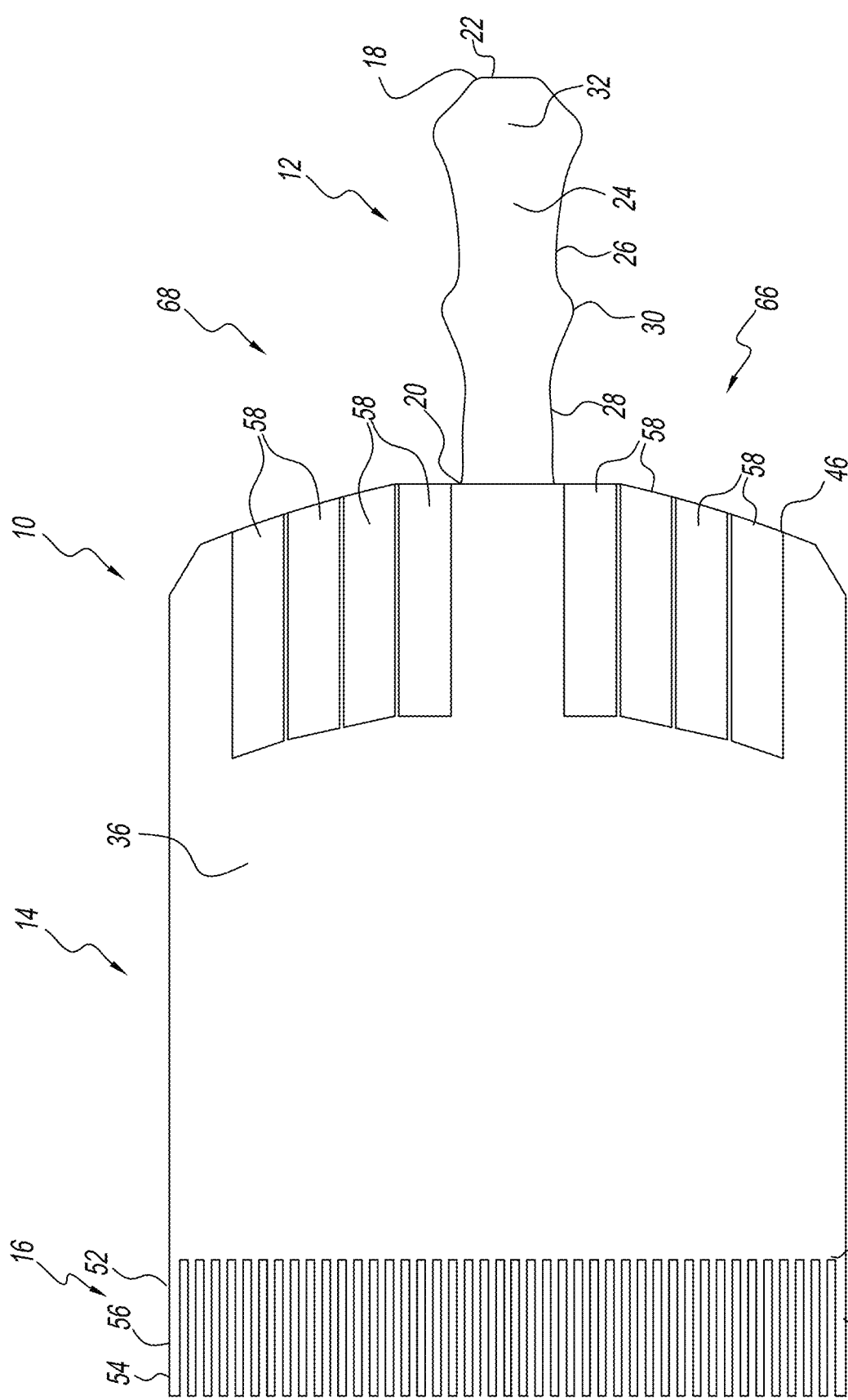
FIG. 4 is a side view of a hand rakepan according to an aspect of the disclosure.
Figure 5:
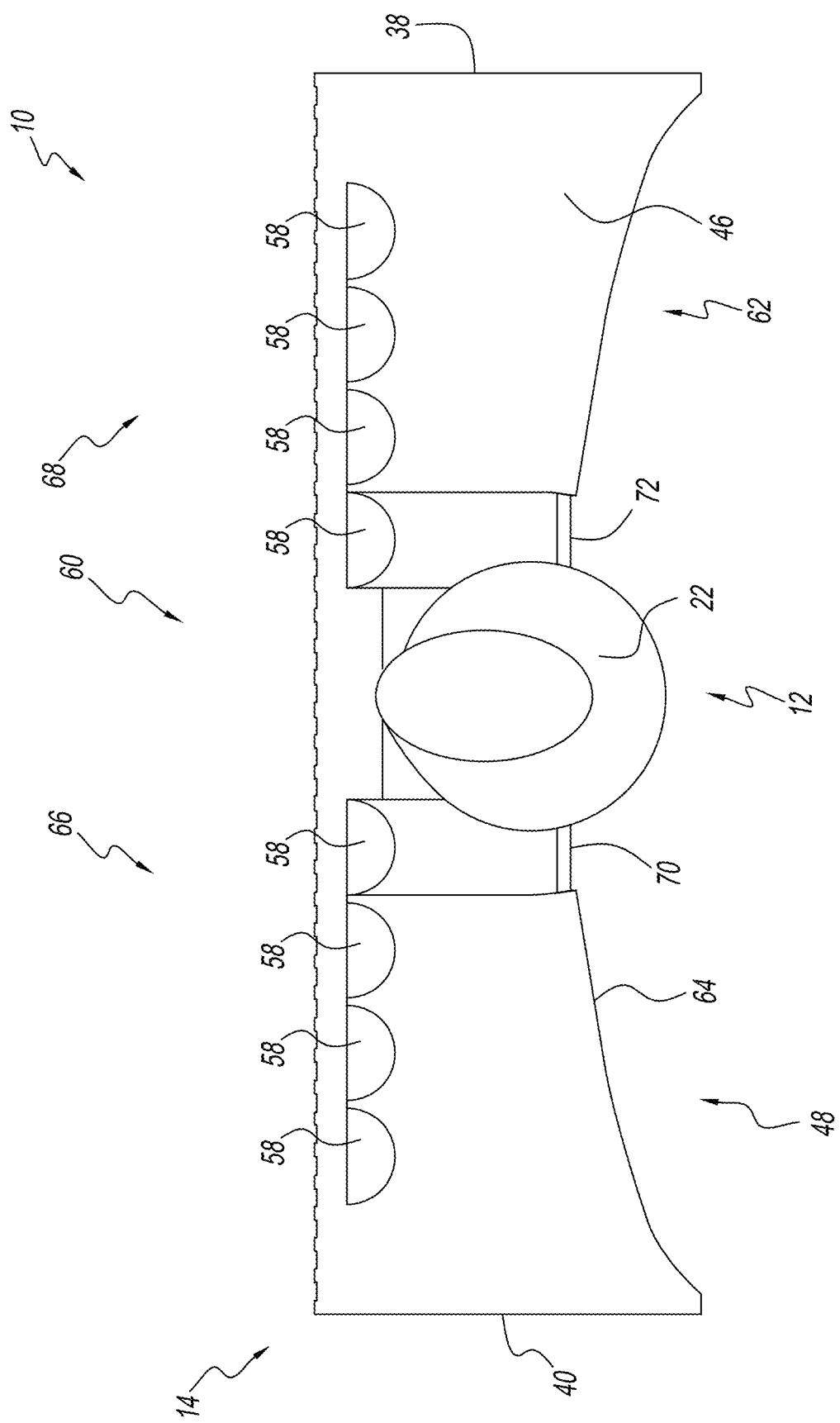
FIG. 5 is a top view of a hand rakepan according to an aspect of the disclosure.

The disclosure described herein is directed to different aspects of a hand rakepan. The detailed description set forth below, in connection with the appended drawings, is intended as a description of various configurations and is not intended to represent the only configurations in which the concepts described herein may be practiced. These descriptions include specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

The disclosure is described herein with reference to certain aspects, iterations, embodiments, and examples but it is understood that the disclosure can be embodied in many different forms and should not be construed as limited to the aspects set forth herein.

Although the terms first, second, etc. may be used herein to describe various elements or components, these elements or components should not be limited by these terms. These terms are only used to distinguish one element or component from another. Hence, a first element discussed herein could be termed a second element without departing from the teachings of the present application. It is understood that actual systems or fixtures embodying the disclosure can be arranged in many different ways with many more features and elements beyond what is shown in the drawings. For the same or similar elements or features, the same reference numbers may be used throughout the disclosure.

It is to be understood that when an element or component is referred to as being "on" another element or component, it can be directly on the other element or intervening elements may also be present. Furthermore, relative terms such as "between", "within", "below", and similar terms, may be used herein to describe a relationship of one element or component to another. It is understood that these terms are intended to encompass different orientations of the disclosure in addition to the orientation depicted in the figures.

Aspects of the disclosure may be described herein with reference to illustrations that are schematic illustrations. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region of a device and are not intended to limit the scope of the disclosure.

With reference to the Figures aspects of a hand rakepan 10 are shown according to the disclosure. The hand rakepan 10 comprises a handle 12, a pan or head 14, and a plurality of tines 16. In some aspects, the handle 12, the head 14, and the plurality of tines 16 are monolithically constructed such that that the hand rakepan 10 is a single uniform body that does not require any assembly. In other aspects, the handle 12, the head 14, or the plurality of tines 16 are separated from the other components to allow disassembly, however, this nature have the deficiency of increasing the steps during manufacturing and assembly. The hand rakepan 10 can be made of any suitable material, including plastic, rubber, metal, or the like that permits durability for its intended purpose as a hand rakepan 10.

The handle 12, which is generally cylindrical in some aspects, extends from a first end 18 to a second end 20. At the first end 18, the handle 12 has an end wall 22 that in some aspects tapers inwardly from the first end 18 towards the second end 20 to reduce the amount of material necessarily for manufacture and the size of the hand rakepan 10.

An exterior surface 24 of the handle 12, extending between the first end 18 and the second end 20, has a flare or first flare 26 and in other aspects has a second flare 28. The first flare 26 in some aspects extends the length of the handle 12 between the first end 18 and the second end 20 and is formed by a recess in the diameter of the handle 12. In this way, the handle 12 tapers inwards onto itself such that the diameter of the handle 12 is smaller near a midpoint 30 of the handle 12 than at the first end 18 and the second end 20. In arrangements with the first flare 26 and a second flare 28, the first flare 26 extends from the first end 18 to, or approximately to, the midpoint 30 and the second flare 28, extends from, or approximately from, the midpoint to the second end 18. In this arrangement, the diameter of the handle 12 between the midpoint 30, and the first end 18, and the second end 20, is less than the diameter at the first end, the midpoint 30, and the second end 20.

The presence of the first flare 26 alone or in combination with the second flare 28 provides a more comfortable grip for an individual while holding the handle 12. When the second flare 28 is present, the individual is naturally inclined to hold the handle 12 closer to the first end 18 with all or the majority of their hand over the first flare 26, which extends the overall length of the hand rakepan 10 while raking. Additionally, when held in this way, arrangements having a midpoint 30 with a larger diameter than the first flare 26, the hand of the individual can brace their grip against the midpoint 30 thereby easing use. When debris is collected, as discussed further herein, the individual is naturally inclined to place their hand over the midpoint 30 such that their hand rests on both the first flare 26 and the second flare 28 thereby stabilizing their grip. In instances where greater control is needed, the individual is naturally inclined to adjust their grip so their hand is primarily or entirely over the second flare 28 as the overall length of the working end of the hand rakepan 10, i.e., the portion of the hand rakepan 10 extending from the head 14 to tine 16 in this instance, is shorter thereby reducing the length of the lever formed by the hand of the individual and the hand rakepan 10.

To permit the hand rakepan 10 to be easily manipulated during both a raking use and a collecting use, the handle 12 in some embodiments is between 9 inches to 11 inches, and in some particular aspects is 10 inches long. The first flare 26 and the second flare 28 are equal sizes and/or lengths (e.g., 5 inches each on a 10 inch handle 12) but in other aspects vary in length and/or size.

In some arrangements of the present invention, an aperture or opening 32 extends through the handle 12 adjacent the first end 18. In such embodiments, the hand rakepan 10 can be hung up using the aperture 32 when not in use. Alternatively, a strap or wrist strap 34 is looped through the aperture 32 such that the strap 34 can be used to hang the hand rakepan 10 from the individual or positioned around the wrist of the individual to further secure the hand rakepan 10 during use and permit the hand rakepan 10 to hang from the wrist when not in use. The presence of the strap also allows the hand rakepan 10 to be hung during storage.

Connected to or constructed from the second end 20 is the head 14. As seen in the exemplary embodiments of the Figures, the head 14 in some embodiments has a triangular profile when viewed from the side formed by the intersection of a top wall 36 that connects or is constructed in perpendicular or generally perpendicular relation with a first side wall 38 and a second side wall 40, which both taper upwardly from a first end 42 of the head 14 to a second end 44 of the head 14 adjacent and/or abutting the tines 16. The top wall 36 in some arrangements is rectangular or substantially rectangular. An end wall 46 of the head 14 extends between the first side wall 38 and the second side wall 40. The end wall 46 also connects or is constructed to the top wall 36. The top wall 36, the first side wall 38, the second side wall 40, the end wall 46, and an open or absent bottom wall 48 create a well 50 to capture debris during use.

In another embodiment of the present invention, the end wall 46 has a curvature such that the end wall 46 curves outwardly from the connection with the first side wall 38 and the second side wall 40 in relation to the tines 16. In certain aspects, the curvature of the end wall 46 is only formed from and adjacent to the first side wall 38 and the second side wall 40 but is otherwise straight along the length of the end wall 46. In such arrangements, the curvature not only provides an aesthetic but increases the size of the well 50 while allowing for stable use of the hand rakepan 10. In some aspects of the present invention, a width of the top wall 36 between the first side wall 38 and the second side wall 40 measures or approximately measures between 8 inches and 12 inches. In certain aspects, a length of the top wall 36 measures or approximately measures between 10 inches and 12 inches, and in particular aspects of the invention the length of the top wall 36 is 11 inches. Sizes larger than this range are too unwieldly to use and cause difficulty in balancing debris during transport and also for on-person storage or storage in a garden bag as the hand rakepan 10 will either inhibit movement and/or will be unable to fit within a garden bag. In still other embodiments, the end wall 46 is or is approximately 1.5 inches tall and the first side wall 38 and the second side wall 40 taper from a length of or approximately 1.5 inches at their connection with the end wall 46 to a length of or approximately 0.0 inches at the second end 44 of the head 14. In this particular arrangement, the dimensions of the head or pan 14 is such to provide ease of use during raking debris, collecting debris, and transporting debris while permitting a substantial of debris to be collected.

The plurality of tines 16 extend from the second end 44 of the head 14. In some aspects, some or all of the plurality of tines 16 have a lateral portion 52 and a curved portion 54. The lateral portion 52 in such arrangements is connected to or constructed from the head 14 and extend straight outwardly and away from the second end 44. The lateral portion 52 transitions into the curved portion 54 that extends downwardly from the lateral portion 52 and the top wall 36 of the head 14 in an arc. In some embodiments, the plurality of tines 16 are flexible but may be rigid in other arrangements. In an exemplary embodiment, some or all of the plurality of tines 16 measure or approximately measure 3 inches in length, which facilitates raking and flexing while also limiting the overall length on the hand rakepan 10 to allow single-hand manipulation of the hand rakepan 10 during at least a raking process.

In some arrangements, a pair of outermost tines 56 and the head 14 are connected or constructed such that the first side wall 38 and the second side wall 40 extend onto the outermost tines 56, respectively. In this way, the well 50 of the head 14 extends, at least partially, onto the plurality of tines 16.

In another aspect of the present invention, the top wall 36 and at least a portion of the end wall 46 has one or a plurality of grooves or channels 58 formed in an exterior surface 60 of the head 14—whereas the well 50 is formed within an interior surface 62. The at least one groove 58 in some aspects extends from a portion of the end wall 46 adjacent to but not abutting a bottom edge 64 of the end wall 46 to a portion of the top wall 36 adjacent to but not abutting the first end 42 of the top wall 36. In this way, the at least one groove 58 extends over the first end 42. Alternatively, the at least one groove extends from the first end 42 along a portion of the top wall 52 to a point adjacent to but not abutting the first end 42. In another aspect, the plurality of grooves 58 consist of four grooves 58 positioned between the handle 12 and the first side wall 38 or the second side wall 38. In other aspects, a first set 66 of the plurality of grooves 58 is positioned between the handle 12 and the first side wall 38 and a second set 68 of the plurality of grooves 58 is positioned between the handle 12 and the second sidewall 40. In some aspects, the one or plurality of grooves 58 are rounded or have a curvature to conform to the rounded nature of an individual's fingers. In still other aspects, the bottom edge 64 of the end wall 46 is rounded or circular and is some aspects has a first notch 70 and/or a second notch 72 with a diameter smaller than the rest of the rounded or circular bottom edge 64 positioned along the bottom edge 64 adjacent and/or abutting the handle 12. In arrangements, having both the first notch 70 and the second notch 72, the first notch 70 is positioned to one side of the handle 12 and the second notch 72 positioned to the other side of the handle 12.

In operation, an individual uses the hand rakepan 10 to gather debris from the ground, which can be facilitated by a comfortable grip of the handle 12 with a single hand grasping the handle 12 on or near the first flare 26 in an overhand grip. Once debris is gathered, the individual can transition their grip forward to cover both the first flare 26 and the second flare 28, or just the second flare 28 such that a sturdier and more secure grip is provided. With their free hand, the user slides under the debris so that the debris is trapped between the free hand and the head 14 and the plurality of tines 16 of the hand rakepan.

During use of the hand rakepan 10 having the one or plurality of grooves 58, the user can place one or more finger within the grooves 58 to allow additional downward force to be applied to the head 14 during raking, to further stabilize the head 14 by supporting the head 14 during collection and transport—either through placement of a thumb in one of the grooves 58 while the remaining fingers grip the handle 12 or if the thumb grips the handle 12 and one or more of the remaining fingers are placed in the grooves. In arrangements, having the first set 66 of the grooves 58 and the second set 68 of the grooves on opposite sides of the handle 12, the hand rakepan 10 provides one or more grooves 58 for either an individual's right or left hand regardless of whether the hand rakepan 10 is being utilized for raking, collecting, or transporting, which require the orientation of individual's hand and the hand rakepan 10 depending on the process being undertaken. In arrangements having a first notch 70 and/or second notch 72, the presence of such allows the placement of an individual's thumb in the notch 72 during one of the grips addressed above. Still further, in aspects of the present invention having a circular or rounded bottom edge 64, the shape of the bottom edge 64 allows one or more finger to grip the bottom edge 64 during use without harming the individual or being otherwise uncomfortable.

Given the hand tool size of the hand rakepan 10 the transport of debris is completed without interruption caused by twisting or other contortion of an oversized head 14 of a traditional rake and without the cumbersome nature of an elongated shaft of a conventional rake. When not in use, the hand rakepan 10 can be hung from the hip of an individual, hung from the wrist of an individual using the wrist strap 34, or conveniently stored in a garden bag.

From the above discussion and accompanying figures and claims it will be appreciated that the hand rakepan 10 offers many advantages over the prior art. Although the present disclosure and its advantages have been described in detail, it should be understood that various changes, substitutions, modifications, and alterations can be made herein without departing from the technology of the disclosure as defined by the appended claims. The scope of the present application is not intended to be limited to the particular configurations of the process, machine, manufacture, composition of matter, means, methods and steps described in the specification only expressly stated otherwise. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein

What is claimed is:

1. A hand rakepan comprising:
   a handle;
   a head connected to the handle at a first end of the head;
   the head having a well formed by an intersection of a top wall connected in general perpendicular relation with a first side wall and a second side wall, an end wall extending to and between the first side wall and the second side wall along and connected to the first end of the head, and an open bottom wall, wherein the first side wall and the second side wall taper upwardly from the first end of the head to adjacent a second end of the head; and
   a plurality of tines connected to the head and extending away from the second end of the head;
   the top wall a having a plurality of grooves formed in an exterior surface of the head, wherein the plurality of grooves have a curvature configured conform to a human finger to facilitate an application of force to the head.

2. The hand rakepan of claim 1 further comprising the head having a generally triangular profile.

3. The hand rakepan of claim 1 further comprising the end wall has a curvature such that the end wall curves outwardly from the connection with the first side wall and the second side wall in relation to the plurality of tines.

4. The hand rakepan of claim 3 wherein the curvature of the end wall is only formed from and adjacent to the first side wall and the second side wall and is otherwise straight along a length of the end wall.

5. The hand rakepan of claim 1 further comprising the top wall and at least a portion of the end wall having at least one groove that extends from a portion of the end wall adjacent to but not abutting a bottom edge of the end wall to a portion of the top wall adjacent to but not abutting the second end of the top wall such that the at least one groove extends over the first end.

6. The hand rakepan of claim 1 further comprising a first set of the plurality of grooves positioned between the handle and the first side wall and a second set of the plurality of grooves positioned between the handle and the second side wall.

7. The hand rakepan of claim 6 wherein the first set of the plurality of grooves and the second set of the plurality of grooves each consist of four grooves.

8. The hand rakepan of claim 1 further comprising a bottom edge of the end wall being rounded.

9. The hand rakepan of claim 1 further comprising a bottom edge of the end wall having a first notch and a second notch.

10. The hand rakepan of claim 9 wherein the first notch is positioned to one side of the handle and the second notch positioned to an opposite of the handle.

11. The hand rakepan of claim 1 further comprising an exterior surface of the handle having a first flare formed by a recess in a diameter of the handle.

12. The hand rakepan of claim 11 further comprising an exterior surface of the handle having a second flare formed by a recess in the diameter of the handle such that the diameter of the handle between the first end and a midpoint is less than the diameter of the handle at the first end, the second end, and the midpoint, and the diameter of the handle between the second end and a midpoint is less than the diameter of the handle at the first end, the second end, and the midpoint.

13. The hand rakepan of claim 1 further comprising an aperture extending through the handle and a strap or wrist strap is looped through the aperture.

14. The hand rakepan of claim 1 further comprising at least one of the plurality of tines having a lateral portion that extends from the head to a curved portion, wherein the curved portion extends outwardly and downwardly in relation to the top wall of the head in an arc.

15. The hand rakepan of claim 1 further comprising the plurality of tines having a pair of outermost tines connected to the first side wall and the second side wall, such that the first side wall and the second side wall extend onto the outermost tines, respectively, such that the well of the head extends at least partially onto the plurality of tines.

16. The hand rakepan of claim 15 wherein the end wall is approximately 1.5 inches tall and the first side wall and the second side wall taper from approximately 1.5 inches at their connection with the end wall to approximately 0.0 inches at the second end of the head.

17. The hand rakepan of claim 1 wherein a length of the handle is between 9 inches to 11 inches, a width of the top wall between the first side wall and the second side wall is between 8 inches and 12 inches, a length of the top wall is between 10 and 12, and a length of the plurality of tines is approximately 3 inches.

18. A hand rakepan comprising:
a handle;
a head connected to the handle at a first end of the head;
the head having a well formed by an intersection of a top wall connected in general perpendicular relation with a first side wall and a second side wall, an end wall extending to and between the first side wall and the second side wall along and connected to the first end of the head, and an open bottom wall, wherein the first side wall and the second side wall taper upwardly from the first end of the head to adjacent a second end of the head;
a plurality of tines connected to the head and extending away from the second end of the head; and
a bottom edge of the end wall having a first notch and a second notch, wherein the bottom edge is rounded and the first notch and the second notch in the bottom edge have a smaller diameter than a remainder of the bottom edge.

* * * * *